J. H. HARRIS.
CHUCKS FOR METAL-TURNING LATHES.
No. 186,245. Patented Jan. 16, 1877.
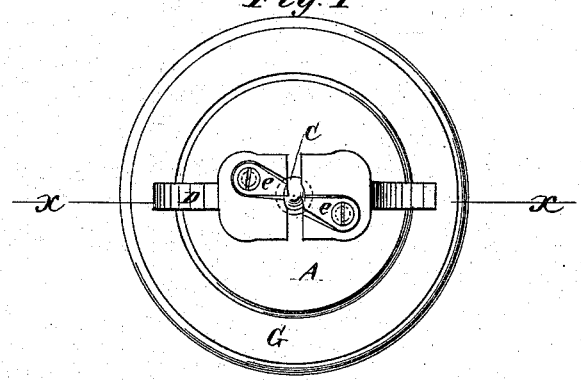
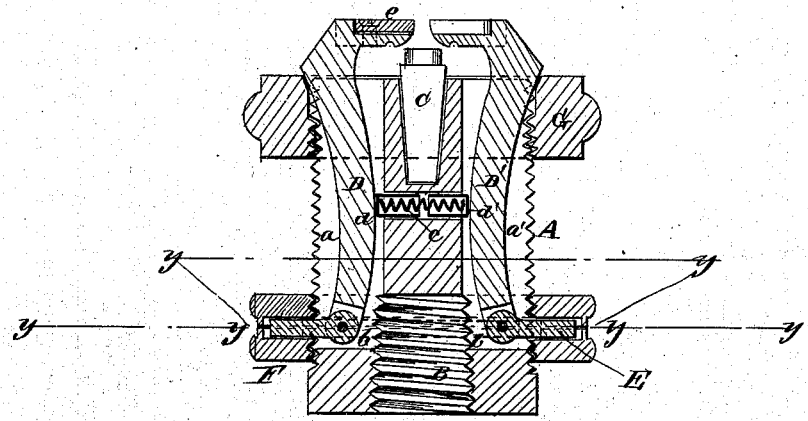
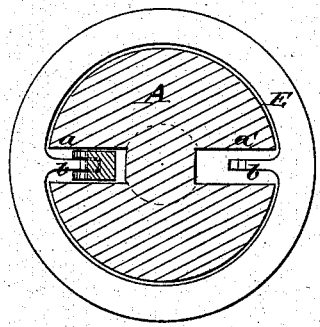
WITNESSES: INVENTOR:

UNITED STATES PATENT OFFICE.

JAY H. HARRIS, OF SACRAMENTO, CALIFORNIA.

IMPROVEMENT IN CHUCKS FOR METAL-TURNING LATHES.

Specification forming part of Letters Patent No. 186,245, dated January 16, 1877; application filed November 11, 1876.

*To all whom it may concern:*

Be it known that I, JAY H. HARRIS, of Sacramento, in the county of Sacramento and State of California, have invented a new and Improved Driver for Lathes, of which the following is a specification:

Figure 1 is an end view of my improved carrier for lathes. Fig. 2 is a longitudinal section on line $x\,x$ in Fig. 1. Fig. 3 is a transverse section on line $y\,y$ in Fig. 2. Fig. 4 is a detail view of one of the jaw attachments for holding a threaded shaft. Fig. 5 is a transverse section on line $z\,z$ in Fig. 4.

Similar letters of reference indicate corresponding parts.

My invention relates to an improved attachment for lathes for driving a shaft while being turned; and it consists of a pair of jaws that may be made to project more or less beyond the lathe-center, and which may be closed tightly on the shaft by a nut working on the hub that contains the said jaws, which closes the jaws by following their inclined sides. It further consists in dogs placed eccentrically in the ends of the jaws, and capable of slightly cutting into the article being turned if it should slip in the jaws.

The object of my invention is to furnish a device for clasping work while being turned in a lathe, so that when the lathe-spindle revolves the work will rotate with it.

Referring to the drawing, A is a hub, which is provided with an internal screw-thread at B, for attaching it to the lathe-spindle, and with a center, C, that takes the place of the lathe-center. The hub A is threaded externally throughout nearly its entire length, and is slotted at $a\,a'$ to receive the jaws D D'.

E is a ring that surrounds the hub A, and is provided with the inwardly-projecting ears $b\,b'$, to which the jaws D D' are pivoted. F is a nut, that is made in two parts, and chambered out to receive the ring E, and engages with the thread on the exterior of the hub A, so that by turning the said nut the jaws are projected more or less through the end of the hub.

A nut, G, is placed on the hub A, and is capable of closing the jaws D D' by following their curved sides. A spring, $c$, placed in the tubes $d\,d'$, having closed ends, presses the jaws apart.

Dogs $e\,e'$ are pivoted in the ends of the jaws D D', and provided with cutting-edges, which are made to bite into the shaft by the resistance of the cutting tool. These jaws are made slightly concave at the center to receive the work.

The driver is placed on the lathe-spindle in place of the ordinary face-plate. The jaws are closed upon the shaft by turning the nut on the outside of the hub. Any tendency in the shaft to slip is checked by the dogs $e\,e'$, which bite deeper into it as the resistance of the tool increases.

In Figs. 4 and 5 a cap is represented that fits over the end of the jaw, and is provided with sections of a screw-thread, which corresponds with the lead of the thread on the article to be worked in the lathe, so that the jaws can be closed upon the article with sufficient force to drive it without injuring the thread.

Having thus described my invention, I claim as new and desire to secure by Letters Patent—

1. The combination of the hub A, curved jaws D D', ring E, nuts F and G, spring $c$, and center C, substantially as herein shown and described.

2. The combination of the dogs $e\,e'$ and jaws D D', substantially as and for the purpose herein shown and described.

JAY H. HARRIS.

Witnesses:
 ROBERT ALLEN,
 JAMES SCOTT.